July 12, 1938.  A. BLOCH  2,123,707
WHEEL DEVICE
Filed June 26, 1937  4 Sheets-Sheet 1
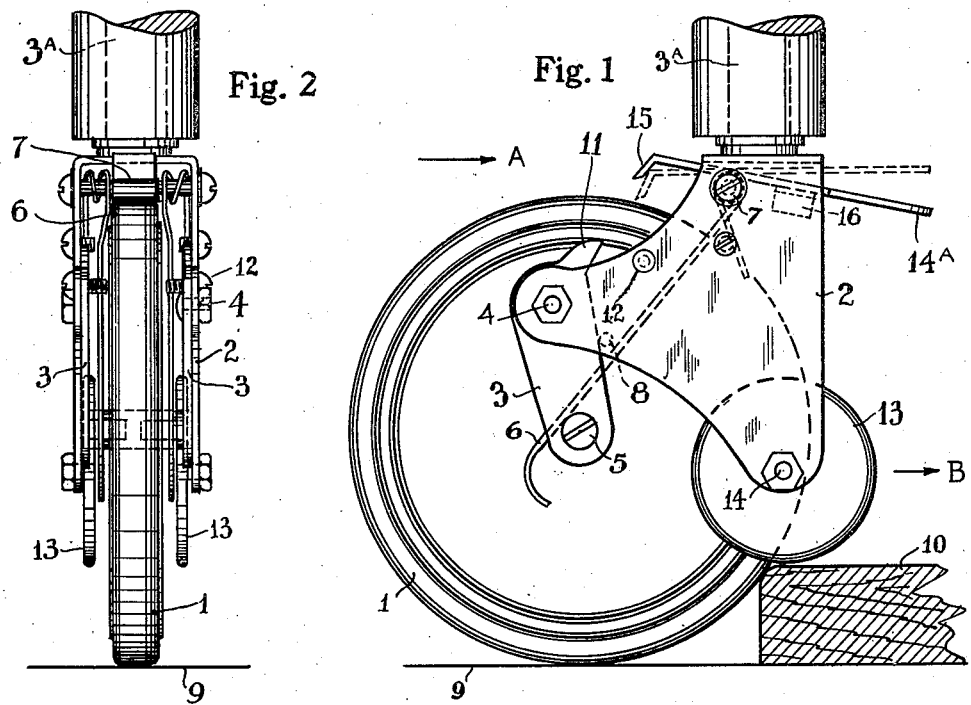
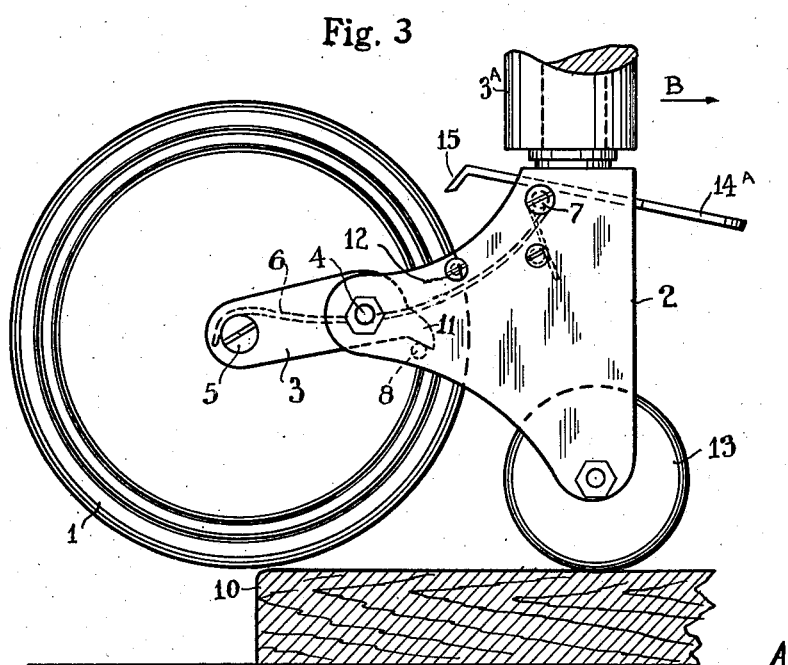
INVENTOR.
Arthur Bloch
BY: Georg Benjamin
ATTORNEY.

July 12, 1938.  A. BLOCH  2,123,707
WHEEL DEVICE
Filed June 26, 1937  4 Sheets-Sheet 2
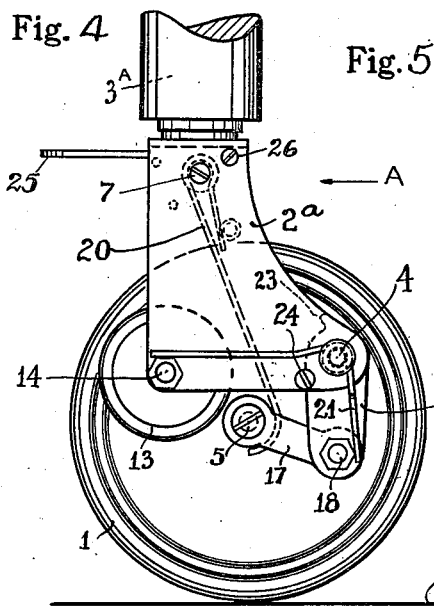
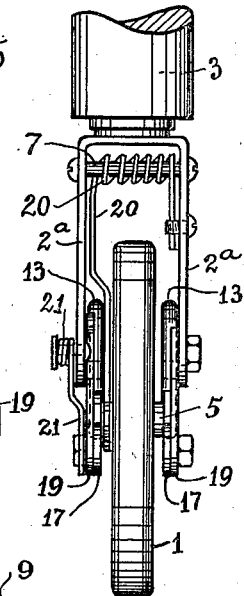
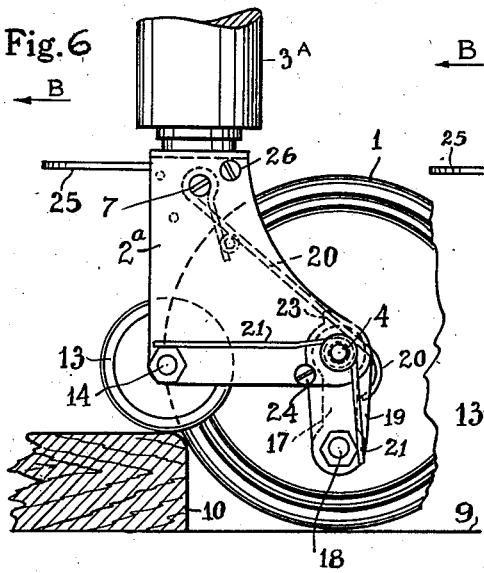
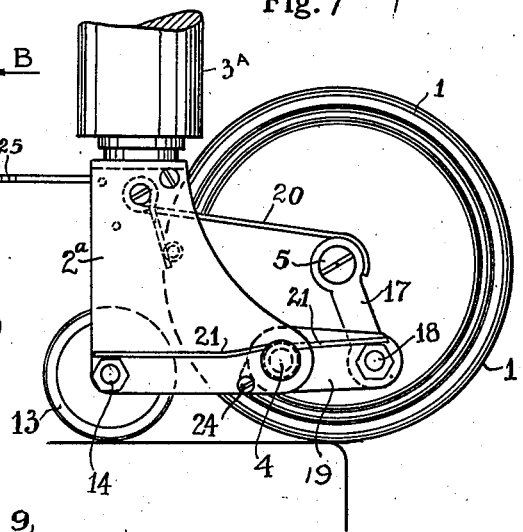
INVENTOR.
Arthur Bloch
BY Georg Benjamin
ATTORNEY.

July 12, 1938.  A. BLOCH  2,123,707
WHEEL DEVICE
Filed June 26, 1937  4 Sheets-Sheet 3

INVENTOR.
Arthur Bloch
BY George Benjamin
ATTORNEY.

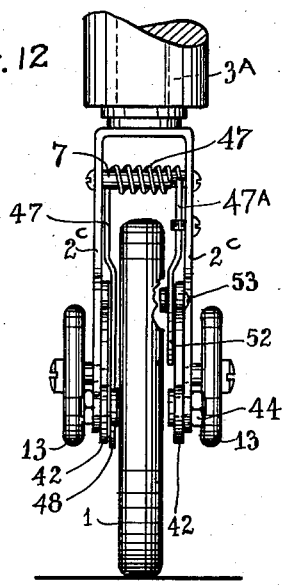
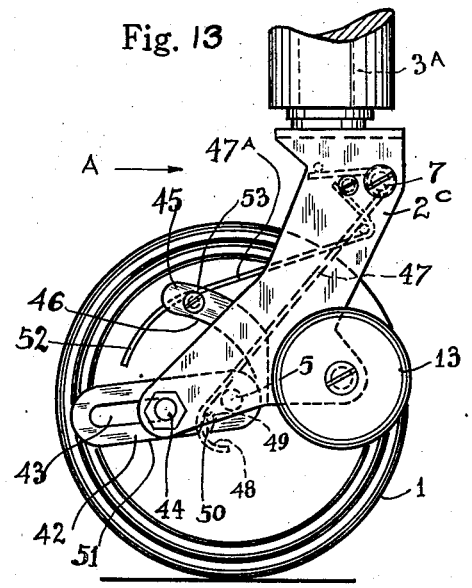
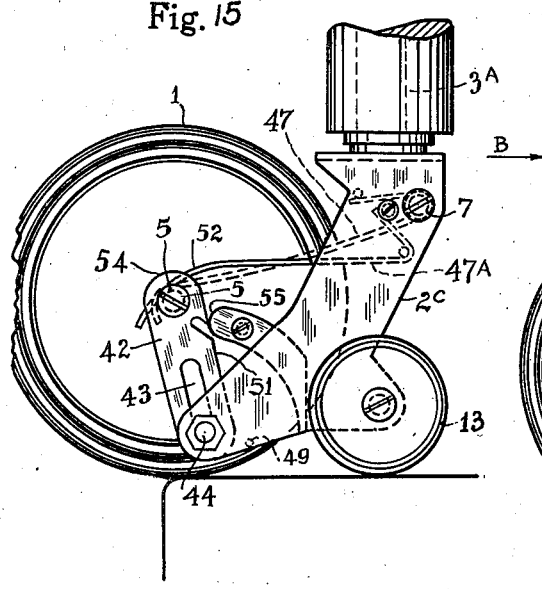
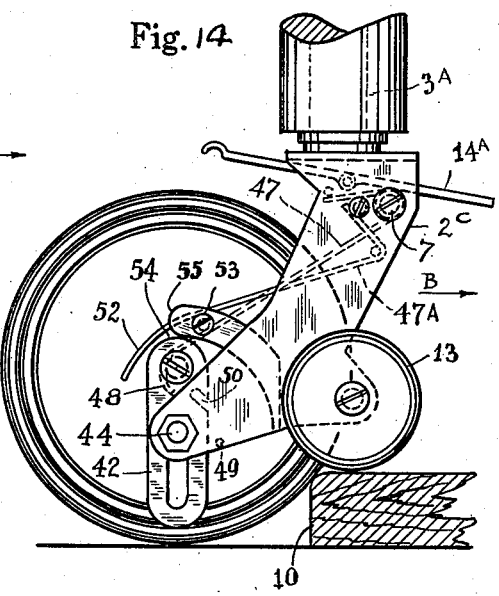

Patented July 12, 1938

2,123,707

UNITED STATES PATENT OFFICE 2,123,707

WHEEL DEVICE

Arthur Bloch, New York, N. Y.

Application June 26, 1937, Serial No. 150,472

5 Claims. (Cl. 16—44)

This invention relates to wheel devices and particularly to caster wheel devices for tables and the like.

For improving the function of such devices on uneven ground it has been already proposed to mount the wheel on its support by means of a link influenced by a spring. It has been found, however, that thereby the action is improved only with respect to depressions in the ground whereas passing over elevated obstacles like thresholds etc., remains difficult and tiresome particularly if the table or the like is moved by pushing instead of pulling.

The inventor has found that this is caused mainly by the fact that the former devices are constructed in such manner that the impact of the wheel against an elevated obstacle causes a tendency for a sudden rise of the forward end of the table and some kind of downward reaction on the wheel.

In distinction therefrom in the object of the invention the wheel is yieldingly mounted on a support in such a manner that by the impact of the wheel against an elevated obstacle is caused a tendency of the support to descend.

The invention will now be described with reference to the accompanying drawings in which:—

Figure 1 is a side elevation of one form of construction of the object of the invention in the moment of reaching a threshold.

Figure 2 is a rear view looking in the direction of the arrow A in Figure 1.

Figure 3 shows the device of Figure 1 on the threshold.

Figure 4 is a side view of a modification in unloaded condition.

Figure 5 is a rear view of Figure 6 looking in the direction of the arrow A in Figure 4.

Figure 6 shows the device of Figure 4 in loaded condition immediately in front of the threshold.

Figure 7 is a side elevation showing the device of Figures 4 and 6 on the threshold.

Figure 12 is a front view of a still further modification looking in the direction of the arrow A in Figure 13.

Figure 13 is a side view of the device of Figure 12 in unloaded condition.

Figure 14 is a side view of the device of Figure 13 in loaded condition immediately in front of a threshold.

Figure 15 is a side view showing the device of Figures 12 to 14 on the threshold.

Figure 9:
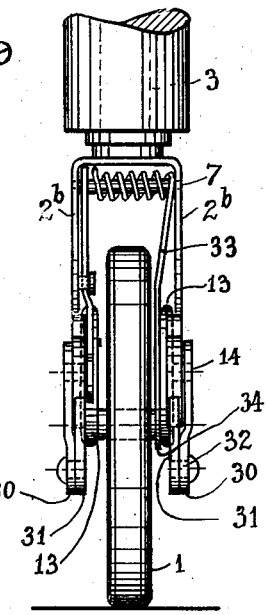
Figure 9 is a rear view of Figure 8 looking in the direction of the arrow A.
Figure 8:
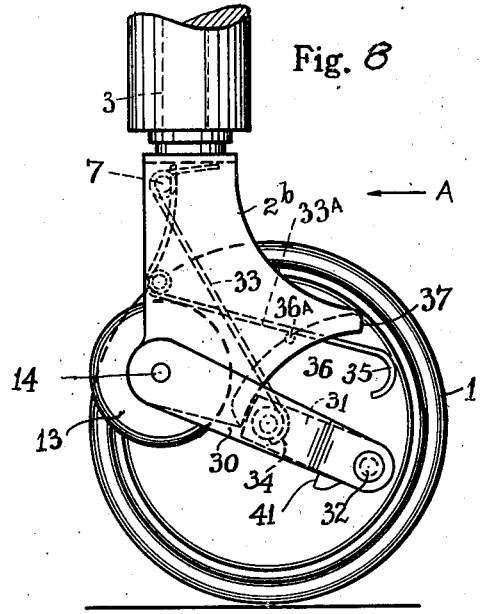
Figure 8 is a side view of a further modification in unloaded condition.

It is to be understood that in all the constructions the parts, links, bolts etc. on one side of the wheel are substantially duplicates of the parts on the other side of the wheel. In other words the parts are arranged in pairs. Therefore it will be sufficient to describe the parts on one side of the wheel only. In some cases the parts may be arranged on only one side of the wheel.

Referring now to the construction in Figures 1 to 3 the caster wheel 1 is mounted on the support or yoke 2 which is rotatable around the pivot 3^A in the usual manner. The wheel 1 is mounted on the support 2 by means of the link 3 which is pivoted on the bolt 4 of the support and on its lower end carries the axle 5 of the wheel 1. A spring 6 is mounted on a bolt 7 of the yoke, and by its free end presses forward the axle 5 and the lower end of the link 3 until the forward edge of the link engages a stop 8 projecting from the support 2. In this condition the link 3 has passed slightly beyond its vertical position and is in a steeply upright position. Therefore any vertical load applied to the support 2 has simply the effect of pressing the link 3 in firmer engagement with the stop 8, and for this reason the load is supported rigidly in the same manner as by any ordinary rigid wheel mounting.

If, however, the wheel, travelling on the even floor 9 in the direction of the arrow B encounters an elevated obstacle like the threshold 10, the wheel is arrested. The axle 5 now acts as a stationary pivot around which the link 3 with the support 2 swings forwardly and downwardly so that the link 3 approaches a more horizontal position. Thereby it is made very easy for the wheel 1 to climb upon the threshold.

A nose 11 of the link 3 is adapted to contact the stop 8 for preventing a too extended movement of the link 3.

Figure 3 shows the device in the moment when the wheel 1 just has climbed the threshold 10.

The desired action is assisted very much by an auxiliary roller 13 mounted on a pivot 14 on the lower front corner of the support 2 considerably ahead of the bolt or pivot 4. When by the impact of the wheel 1 against the threshold 10 the support 2 descends the auxiliary wheel or roller 13 comes in engagement with the upper surface of the threshold 10 at a point ahead of the front of said threshold for a distance much longer than the link 3, relieves the wheel 1 from at least part of the load, and because of said long distance makes it easier for the wheel to climb the threshold, as clearly shown in Figure 3.

With the modifications now to be described the climbing of thresholds etc. is facilitated by a double mobility.

In the modification shown in Figures 4 to 7 the axle 5 of the wheel 1 is supported by a link 17 the other end of which is connected by a bolt 18 with a second link 19 pivoted on the bolt 4 on the rear lower corner of the support 2$^a$. A spring 20 is coiled around the brake bolt 7 and presses with its free hook shaped end against the axle 5. Another spring 21 is coiled around the end of the pivot 4 and presses with its free end against the pivot 18, whereby the front edge of the link 19 is pressed against a stop 24 supported by the yoke 2$^a$. Figure 4 shows the parts in unloaded condition of the device. In this condition the link 19 points downwardly from the bolt 4, and the link 17 points forward and slightly upward from the pivot 18.

When a load is applied to the support 2 said support is lowered whereby the link 17 is swung upward around the pivot 18 until the link 17 is substantially vertical and overlaps the link 19, as illustrated in Figure 6. During this movement the spring 20 yields.

Because of the substantially vertical position of the links 17 and 19, the load is supported rigidly by the wheel.

When the wheel 1 rolling on the even floor 9 in the sense of the arrow B meets the threshold 10 the link 17 remains substantially upright, whereas the link 19 swings around the pivot 18 forward and downward to substantially the position shown in Figure 7, whereby the support 2$^a$ is lowered and it is made easier for the wheel 1 to climb the threshold 10 as shown in Figure 7. A nose 23 on link 19 prevents a too extended movement of the link by engagement with the stop 24 on the support 2$^a$.

In this as well as in the other modifications the action is improved by auxiliary wheels or rollers 13, the lowermost points of which are located ordinarily at a higher level than the lowermost point of the wheel 1 so that these auxiliary rollers usually do not support any load, but can relieve the wheel 1 in climbing a threshold because of the distance between the pivots 4 and 14.

The moment the wheel 1 passes the threshold, the wheel snaps down again to the position shown in Figure 6 under the influence of the springs.

Now the modification shown in Figures 8 to 11 is to be described.

The wheel 1 is supported in the support or yoke 2$^b$ by means of the links 30 and 31. The link 30 is mounted on the bolt 14 supporting the auxiliary roller 13 on the support 2$^b$. The link 31 is connected with the link 30 by means of a bolt or pivot 32 and is connected at its other end with the axle 5 of the wheel 1. A spring 33 is supported by the bolt 7 and presses by its hook shaped end 34 against the axle 5, whereby, in unloaded condition, the parts are held in the positions shown in Figure 8. In accordance with Figure 8 the link 30 is pointing downward and rearward, whereas the link 31 is pointing forward and upward substantially overlapping the link 30. In this condition the hook shaped end 35 of another spring 33$^A$ is idly supported by a bolt 36$^A$ provided on the support 2.

The support 2$^b$ is provided with an arc-shaped guide surface 36 against which the upper front surface 38 of the link 31 abuts.

Figure 10:
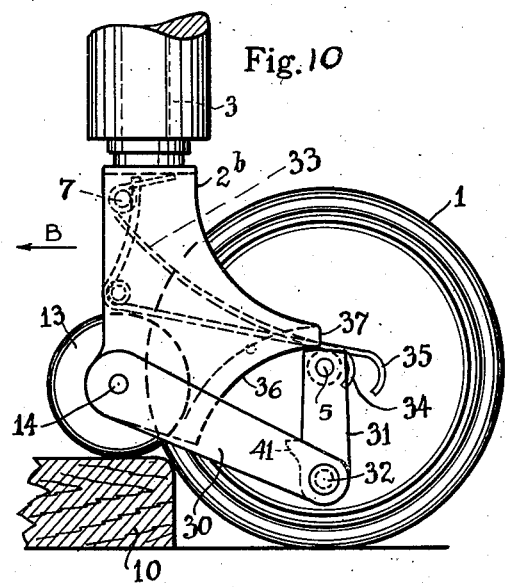
Figure 10 is a side view showing the device of Figure 8 in loaded condition immediately in front of a threshold.

When load is applied to the support 2$^b$ the spring 33 yields, and the parts move more or less to the positions shown in Figure 10, in which the spring hook 35 has entered into engagement with the axle 5. During this movement the surface 38 is guided by the guide surface 36 which takes up the load so that normally this device acts like a normal rigid caster wheel device.

When, however, the wheel 1 meets a threshold 10 the link 30 swings downward around the pivot 32 whereby the support 2$^b$ is lowered. The spring 33 yields permitting this movement. By the latter the rear edge 37 of the support 2$^b$ passes beyond the front 39 of the link 31 and, thereupon, travels downward along the front edge 40 of the link 31 until the guide surface 36 engages a stop 41 provided on said front edge for preventing further movement of the parts.

Figure 11:
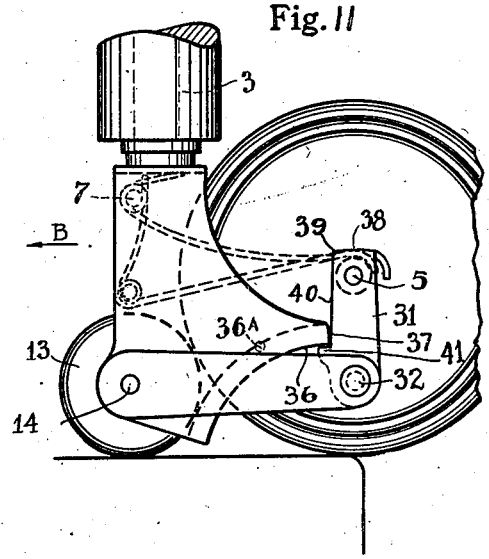
Figure 11 is a side elevation showing the device of Figure 8 on the threshold.

By these movements and displacements of the parts it is made easy to the wheel 1 to climb the threshold 10 as shown in Figures 10 and 11.

As soon as the wheel 1 passes the threshold 10 it snaps again to the position shown in Figure 10 under the influence of the springs.

Of course also this modification can be provided with a brake substantially as described in connection with the former modifications, such brake being supported also by the rotatable support 2$^b$.

In the modification shown in Figures 12 to 15 a double mobility of the wheel 1 on the support 2$^c$ is obtained by means of a single link.

The axle 5 of the wheel 1 is supported by a link 42 provided with a slot 43 in which is slidably received a bolt 44 supported by the support 2$^c$. To the latter is secured an arc-shaped rigid part 45 provided with a guide surface 46 for that end of the link 42 which supports the axle 5. The bolt 7 supports a spring 47, the hook shaped end 48 of which presses against the axle 5 thereby holding the parts in unloaded condition in the position shown in Figure 13. In this position a pin 49 of the support 2$^c$ engages into a slot 50 provided in the front edge 51 of the link 42, thereby securing the parts in their positions.

In the position shown in Figure 13 the shank 52 of a second spring 47$^A$ is idly supported by a pin 53 projecting inwardly from the guide part 45.

When load is applied to the support 2$^c$ the link 42 swings around the pivot 44 to the position shown in Figure 14. During this movement the front surface 54 of the link 42 travels along the guide surface 46 which acts as an abutment taking up the load until substantially the position shown in Figure 14 is reached. Because of this abutment action of the part 45 the device acts like any ordinary rigid caster wheel device on even ground.

When, however, the wheel 1 meets a threshold 10 the link 42 swings forward around the axle 5 and the rear surface 55 of the abutment 45 slides downward along the front surface 51 of the link 42, whereas the bolt 44 travels downward in the slot 43 until substantially the position of Figure 15 is reached in which the bolt 44 abuts against the end surface of the slot 43. During this movement the shank 52 of the spring 47$^A$ is engaged and further tensioned by the axle 5 as shown in Figure 15.

Therefrom it can be seen that the link 42 has a swinging relative movement around the axle 5 and a sliding relative movement along the bolt 44 and that the link 42 in its action is similar to a scale beam supported on the bearing surface 55.

Also in this modification by the impact of the wheel 1 against the threshold 10 an initial tendency to descend is caused for the support 2 until the auxiliary rollers 13 engage the upper surface of the threshold.

The moment the wheel 1 passes the rear edge of the threshold the wheel is snapped back to the position shown in Figure 14 by the spring.

It has been found that all the modifications function satisfactorily without use of the auxiliary wheels. By the latter, however, the action is very much improved.

What I claim is:

1. A wheel device and particularly a caster wheel device comprising in combination a wheel normally supporting the load in a positive manner, a support for said wheel, a link mechanism for connecting said wheel with said support, spring means adapted to snap said wheel downwardly behind projections of the floor, said link mechanism normally transmitting the load reaction of said wheel positively to said support, a link of said link mechanism normally constituting a rigid thrust member abutting against said support from below, abutment means on said support adapted to prevent forward and upward movement of said link and wheel under normal conditions but to permit upward and backward movement of said link and wheel after said link will have been knocked clear of said abutment means by the impact of said wheel against an obstacle.

2. A device as in claim 1 in which stop means are provided for preventing a too extended upward movement of said link.

3. A device as in claim 1 in which said link is connected with said support by a pivot and with said wheel by the axle of the latter and is held by the load reaction against said abutment means so that normally said axle is located below and slightly ahead of said pivot.

4. A device as in claim 1 in which said link is pivotally connected with a second link which, in turn, is pivoted to the axle of said wheel, said spring means including first spring means tending to hold said link against said abutment means, in unloaded condition of said wheel, in a downwardly pointing position, and additional spring means, tending to hold said second link in a forwardly pointing position in said unloaded condition, whereas by the weight of the load said second link is swung upward, against the force of said additional spring means, to a position substantially parallel with said first link, and by the impact of said wheel against an obstacle said first link is swung to a less upright position against the force of said first spring means, but said second link is lifted in and to an upright position against the force of said additional spring means.

5. A device as in claim 1 in which said link is pivoted to the wheel axle and to a second link in turn pivoted to said support, and in which on said support a guide surface is provided as the load supporting abutment for said link, said spring means tending to hold said link under said abutment.

ARTHUR BLOCH.